US011600076B2

(12) United States Patent
Altinger

(10) Patent No.: US 11,600,076 B2
(45) Date of Patent: Mar. 7, 2023

(54) DETECTION OF A HAZARDOUS SITUATION IN ROAD TRAFFIC

(71) Applicant: Audi AG, Ingolstadt (DE)

(72) Inventor: Harald Altinger, Gerolfing (DE)

(73) Assignee: AUDI AG, Ingolstadt (DE)

(*) Notice: Subject to any disclaimer, the term of this patent is extended or adjusted under 35 U.S.C. 154(b) by 399 days.

(21) Appl. No.: 16/071,805

(22) PCT Filed: Jan. 16, 2017

(86) PCT No.: PCT/EP2017/050751
§ 371 (c)(1),
(2) Date: Sep. 5, 2018

(87) PCT Pub. No.: WO2017/125332
PCT Pub. Date: Jul. 27, 2017

(65) Prior Publication Data
US 2019/0205669 A1 Jul. 4, 2019

(30) Foreign Application Priority Data
Jan. 23, 2016 (DE) .................... 10 2016 000 723.0

(51) Int. Cl.
G06K 9/00 (2022.01)
G08G 1/01 (2006.01)
(Continued)

(52) U.S. Cl.
CPC ............. *G06V 20/58* (2022.01); *B60W 50/14* (2013.01); *G06V 20/56* (2022.01); *G06V 20/584* (2022.01);
(Continued)

(58) Field of Classification Search
CPC .......... G06K 9/00805; G06K 9/00791; G06K 9/00825; G08G 1/165; G08G 1/163;
(Continued)

(56) References Cited

U.S. PATENT DOCUMENTS 7,903,021 B2  3/2011  Aso et al.
9,445,308 B2  9/2016  Römmele et al.
(Continued)

FOREIGN PATENT DOCUMENTS

CN    2826561 Y    10/2006
CN    101395649 A    3/2009
(Continued)

OTHER PUBLICATIONS

English-language abstract of Japanese Patent Application Publication No. 1172563 A, published on Mar. 16, 1999; 1 page.
(Continued)

Primary Examiner — Nga X Nguyen
(74) Attorney, Agent, or Firm — Sterne, Kessler, Goldstein & Fox P.L.L.C.

(57) ABSTRACT

A method is disclosed for detecting a hazardous situation in road traffic, wherein visible surroundings of a motor vehicle are scanned by way of at least one surroundings monitoring sensor for the presence of a trigger. Upon detection of the trigger, data regarding the surroundings of the motor vehicle is collected by the at least one surroundings monitoring sensor in a trigger-specific radius around the trigger. Pieces of information based on the collected data are transmitted via a communication device to at least one receiver that is independent of the motor vehicle.

21 Claims, 1 Drawing Sheet

(51) Int. Cl.
*G07C 5/00* (2006.01)
*G06V 20/58* (2022.01)
*G08G 1/16* (2006.01)
*G08G 1/0962* (2006.01)
*B60W 50/14* (2020.01)
*G08G 1/0967* (2006.01)
*G06V 20/56* (2022.01)
*G01S 13/931* (2020.01)

(52) U.S. Cl.
CPC .......... *G07C 5/008* (2013.01); *G08G 1/0112* (2013.01); *G08G 1/0133* (2013.01); *G08G 1/09623* (2013.01); *G08G 1/096783* (2013.01); *G08G 1/163* (2013.01); *G08G 1/164* (2013.01); *G08G 1/165* (2013.01); *G01S 2013/9316* (2020.01)

(58) Field of Classification Search
CPC .............. G08G 1/164; G08G 1/09623; G08G 1/096783; G08G 1/0112; G08G 1/0133; B60W 50/14; G07C 5/008; G01S 2013/9316
See application file for complete search history.

(56) References Cited

U.S. PATENT DOCUMENTS

| | | | |
|---|---|---|---|
| 2005/0134440 A1* | 6/2005 | Breed | G01S 17/89 340/435 |
| 2007/0054685 A1 | 3/2007 | Kellum | |
| 2008/0309468 A1* | 12/2008 | Greene | G08G 1/165 340/436 |
| 2009/0303026 A1 | 12/2009 | Broggi et al. | |
| 2011/0187560 A1 | 8/2011 | Stählin | |
| 2015/0375756 A1* | 12/2015 | Do | B60W 30/0956 701/1 |
| 2016/0133131 A1* | 5/2016 | Grimm | G08G 1/096725 701/117 |

FOREIGN PATENT DOCUMENTS

| | | |
|---|---|---|
| CN | 102842244 A | 12/2012 |
| CN | 103253259 A | 8/2013 |
| CN | 104103181 A | 10/2014 |
| CN | 104240537 A | 12/2014 |
| CN | 104396329 A | 3/2015 |
| DE | 102006041569 A1 | 5/2007 |
| DE | 102007049249 A1 | 4/2008 |
| DE | 102008011655 A1 | 8/2008 |
| DE | 102008037883 A1 | 4/2009 |
| DE | 102008043755 A1 | 5/2010 |
| DE | 102008043761 A1 | 5/2010 |
| DE | 10 2010 028 613 A1 | 11/2010 |
| DE | 102009028476 A1 | 2/2011 |
| DE | 102010053155 A1 | 6/2012 |
| DE | 10 2013 004 271 A1 | 9/2013 |
| EP | 2212175 A1 | 8/2010 |
| EP | 2528049 A1 | 11/2012 |
| JP | H 1172563 A | 3/1999 |

OTHER PUBLICATIONS

English language abstract of German Patent Application Publication No. 102007049249 A1 published on Apr. 17, 2008; 1 page.
English language abstract of German Patent Application Publication No. 102008011655 A1 published on Aug. 14, 2008; 1 page.
English language abstract of German Patent Application Publication No. 102008043755 A1 published on May 20, 2010; 2 pages.
English language abstract of German Patent Application Publication No. 102008043761 A1 published on May 20, 2010; 2 pages.
English language abstract of International Patent Application Publication No. 2212175 A1 published on Aug. 4, 2010; 2 pages.
English language abstract of German Patent Application Publication No. 102009028476 A1 published on Feb. 17, 2011; 2 pages.
English language abstract of German Patent Application Publication No. 102010053155 A1 published on Jun. 6, 2012; 2 pages.
International Search Report and Written Opinion of the International Search Authority directed to related International Patent Application No. PCT/EP2017/050751, dated Jul. 17, 2017, with attached English-language translation of the Annex; 20 pages.
Written Opinion of the International Search Authority directed to related International Patent Application No. PCT/EP2017/050751, dated Dec. 19, 2017, with attached English-language translation of the Annex; 8 pages.
International Preliminary Report on Patentability, directed to related International Patent Application No. PCT/EP2017/050751, dated Sep. 13, 2018, with attached English-language translation; 12 pages.
Chinese Application No. 201780012919.4, Office Action dated Jul. 3, 2020; attached English Translation from EPO Global Dossier, 16 pages.
Office Action filed in application No. EP 17700523.8; dated Oct. 29, 2021; 10 pages.

\* cited by examiner

DETECTION OF A HAZARDOUS SITUATION IN ROAD TRAFFIC

TECHNICAL FIELD

This disclosure relates to a method for detecting a hazardous situation in road traffic, wherein visible surroundings of a motor vehicle are scanned by way of at least one surroundings monitoring sensor for the presence of a trigger.

BACKGROUND

Vehicles that have broken down or are involved in an accident can block lanes of roads and thus represent a hazard for following traffic. While most highways have breakdown lanes, such a broken-down vehicle can nonetheless impair the flow of traffic.

So as to make other road users aware of the hazardous situation, legal regulations require that a warning triangle be placed at an appropriate distance from the hazardous area. At the same time, persons should preferably wear reflective vests upon leaving the vehicle outside towns.

Despite these measures, the position of the broken-down vehicle is difficult to see for other road users in blind breakdown locations, such as on highway off-ramps, in curves or in tunnels. This can result in dangerous situations.

Driver assistance systems are known from the prior art for reducing the hazard. It is proposed in DE 10 2008 043 761 A1, for example, to adapt a driver assistance system based on pieces of traffic sign information. It is proposed to prepare a hard brake as soon as a warning triangle is identified on the roadside. Likewise, a warning can be provided to the driver. However, this principle may fail due to the fact that warning triangles are often not placed at a sufficient distance from the hazardous area. Accordingly, it may be too late to avoid an impending accident despite an adapted driver assistance system. Moreover, a vehicle must comprise such an assistance system to ensure appropriate protection, which is technologically precluded, in particular, in older vehicles.

Another method for avoiding accidents and collisions is known from US 2005/0134440 A1, which is an application of the type in question. A comparable system is also described in JP H11 72563 A. The surroundings of the motor vehicle are continuously scanned by way of a surroundings monitoring sensor for the presence of a hazardous object and, where necessary, data regarding the detected object is collected so as to avoid a collision in case of doubt. The above-described disadvantages, however, are not avoided by such an assistance system either.

So as to alert road users of a hazardous area at an early stage, the use of a Traffic Message Channel (TMC) is known from the prior art. With this technology, traffic disruptions are transmitted in digital form in the very high frequency range. As a result, navigation systems can receive traffic congestion notices, drivers can be warned and, where necessary, even the route can be recalculated. The emission of TMC signals has been adopted, in particular, by a number of radio stations throughout Europe. In practice, it has been found that the quality of the traffic alerts is frequently imprecise, and that some of the information is not up-to-date. This is usually due to the fact that the data of the TMC centers is based on the frequently imprecise and limited information provided by road users, police information, traffic cameras and the like.

Furthermore, a warning triangle for a vehicle is proposed in DE 10 2010 053 155 A1, wherein the warning triangle comprises a transmitter for wirelessly transmitting data to a receiver. The warning triangle can then be used to notify motor vehicles approaching the warning triangle. It is also conceivable that the warning triangle transmits its own GPS position. The disadvantage of such a system is, in particular, the fact that individuals frequently forget to set up a warning triangle. Likewise, individuals often forget to remove a set-up warning triangle again. The information is consequently not absolutely reliable.

Furthermore, this method provides only information about the position of the warning triangle itself, but not about the position of the broken-down vehicle or the hazardous area. It is also not possible to classify the hazardous situation.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
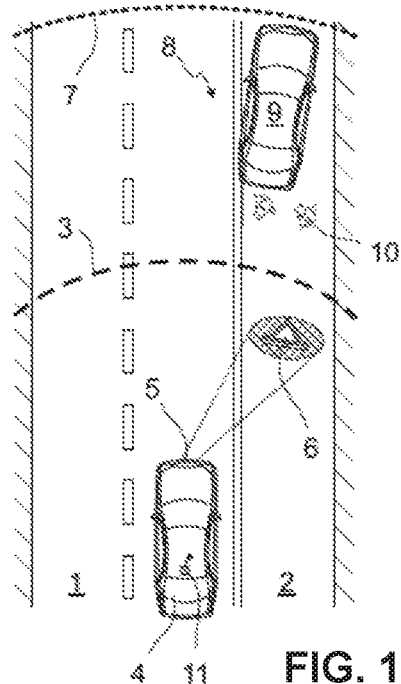
FIG. 1 illustrates a schematic representation of a traffic situation including a trigger and a subsequent hazardous situation, according to some embodiments.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

It is the object of this disclosure to identify the hazardous situation in road traffic quickly and in great detail, and to transmit this to other motor vehicles or notification agencies.

Because once a trigger is detected, data regarding the surroundings of the motor vehicle can be collected in a specific radius around the trigger using motor vehicle-internal surroundings monitoring sensors, it is possible to record and analyze a hazardous situation with high detail accuracy.

It may be advantageous not to continuously scan the surroundings of the motor vehicle for a hazardous situation by way of the surroundings monitoring sensors of the motor vehicle. In contrast, the presence of a trigger that is easy to detect is checked. This method not only saves computing power, but also ensures that the surroundings monitoring sensors are largely available for other assistance systems. Only the detection of the trigger causes the vehicle-internal surroundings monitoring sensors to be used for a defined distance from the trigger in the driving direction, or for a certain driving time after detection of the trigger, so as to search for hazardous objects and record surroundings data. If a relevant hazardous situation for road traffic should have been identified in the defined monitoring radius upon detection of the trigger, this information can be transmitted to at least one receiver that is independent of the motor vehicle, using information density that is appropriate for the corresponding situation.

Because a motor vehicle participating in road traffic is used to identify the dangerous traffic situation caused by broken-down vehicles or other traffic disruptions and to relay this position, an identification can take place extremely quickly, and following road users can be warned. On a road that is not heavily traveled, the reporting of a hazardous situation can, of course, also take place with delay in the absence of passing motor vehicles. The urgency of the information, however, is also accordingly lower for the less traveled road.

Upon detection of the trigger in the trigger-specific radius around the trigger, a search for hazardous objects may take place by way of the at least one surroundings monitoring sensor, and that, upon detection of a hazardous object, object-specific data regarding the hazardous object may be collected.

In one embodiment, the object-specific data of the at least one detected hazardous object can comprise pieces of position information and/or pieces of classification information and/or pieces of geometry information and/or pieces of color information and/or pieces of texture information and/or pieces of dynamics information about the at least one hazardous object.

The compilation of the above-mentioned pieces of information can be advantageous for classifying a hazardous situation for other road users with high quality. The position information, in particular as it relates to the hazardous object itself, and not the trigger or the motor vehicle identifying the situation, is highly relevant, in particular in blind hazard locations. Furthermore, it may be advantageous to classify a hazardous object. Known devices and methods can be used for this purpose. Pieces of geometry information, pieces of color information and pieces of texture information of an identified hazardous object can be helpful for further grading. It can furthermore be advantageous to record pieces of dynamics information about the known hazardous objects. These may be movement or acceleration vectors, for example.

In one embodiment, the pieces of position information can be determined, on the one hand, from a global motor vehicle position and, on the other hand, from data of at least one distance sensor with respect to a relative distance between the one or more hazardous objects and the motor vehicle. A global position shall be understood to mean a description of the location of a point on the earth, for example in the form of geographic coordinates.

As mentioned above, in particular the position information of a hazardous object can be an important piece of information. The position determination should therefore take place in an accordingly exact manner. Advantageously, the absolute position of the motor vehicle identifying the hazardous object can be merged with sensor data of a distance sensor of this motor vehicle. The sensor can preferably be an existing sensor of an adaptive cruise control (ACC) system. The position of an identified hazardous object can thus be ascertained as an individual global position. It is also possible to use a camera system, a laser system, an ultrasonic system or another system that appears to be suitable so as to ascertain the relative position of the hazardous object.

The global motor vehicle position can be determined by way of the global positioning system (GPS). Of course, it is also conceivable to determine the position using other methods. For example, the position determination can take place by way of a differential GPS or a similar system for improving a conventional GPS method. The use of further satellite navigation systems, such as GLONASS, Galileo, Beidou or the Indian Regional Navigation Satellite System is also possible.

In one embodiment, it may furthermore be provided to include road traffic-relevant data in the data regarding the surroundings of the motor vehicle upon detection of the trigger. The road traffic-relevant data can contain pieces of traffic dynamics information. For example, information as to the speed at which traffic is moving around a hazardous situation may be ascertained. Furthermore, pieces of driving lane information can be recorded. In particular, the number and allocation of the lanes of the road and the position of a hazardous object relative to the driving lanes can represent a piece of relevant information for a roadside assistance service, for example. Further road traffic-relevant data can include pieces of weather information or pieces of road soiling information. For example, it can be detected whether, as a result of an accident, a liquid, such as oil or the like, impairs the roadway.

In one embodiment, a warning triangle and/or a reflective vest and/or a visual special-purpose signal of an emergency vehicle may be used as the trigger. The use of the above-mentioned triggers can be advantageous because these can be reliably identified using simple means and a simple sensor system. For example, warning triangles and reflective vests have good reflection properties. This can also make the use of a simple mono front camera for identification purposes possible, including at night. Of course, any other form of visual or other identification of such a trigger can also be used. For example, a stereo camera or a night vision camera can be used to identify the trigger. It is also possible to use an existing system for traffic sign monitoring. Visual special-purpose signals of emergency vehicles are also easy to detect because these are usually strong light signals in specific colors of light. It is also conceivable, of course, to use an acoustic special-purpose signal, for example an emergency siren, as the trigger.

The trigger or triggers to be used may be stored on a closed-loop and/or open-loop control unit or the like in the motor vehicle. However, the trigger or triggers may be provided by a receiver that is independent of the motor vehicle. Such a receiver can preferably be a TMC center or a roadside assistance service, a government agency or other road users. Finally, the trigger or triggers to be used may be obtained from an Internet database, such as a so-called cloud.

In one embodiment, the trigger or triggers can be established in a flexible manner by a driver of the motor vehicle. As an alternative or in addition, the triggers can be established by a TMC center and/or a roadside assistance service and/or a government agency and/or further receivers. The trigger or triggers may also be defined in a standard.

In one embodiment, a broken-down vehicle and/or an emergency vehicle and/or a person and/or debris may be defined as the hazardous object. Of course, other hazardous objects that are of relevance for road traffic are also conceivable. For example, animals or transported cargo can be classified as hazardous objects.

In one embodiment, a camera system or a night vision system or devices of an adaptive cruise control system may be used as the surroundings monitoring sensor. Of course, this list shall not be considered to be exhaustive. In particular, it is advantageous to use existing motor vehicle-internal sensors for monitoring the surroundings and identifying a trigger. For example, a night vision camera or an infrared camera can be used to detect persons. In this way, a heat signature can be used to infer a person or an animal. It is also possible to use radar systems and LIDAR systems. It is also conceivable that a hazardous object, for example a broken-down vehicle, or a trigger, for example, a warning triangle, outputs a visual signal, an acoustic signal or a radio signal. It is then possible to use an appropriately suitable sensor system of the motor vehicle, for example, an infrared detector, a microphone or a radio receiver, for identifying such a signal.

In one embodiment, the communication device may transmit the recorded data regarding the surroundings of the motor vehicle to a TMC center and/or a database of a roadside assistance service and/or a government agency and/or other road users.

It may be advantageous to transmit, in particular, position data and pieces of classification information on detected hazardous objects. In this way, it is also possible, for example, to transmit also a number of persons involved in a hazardous situation to a central agency or to other road users. For example, a TMC center can evaluate these pieces of information and relay these to the other road users. The use of a vehicle-to-vehicle network, for example, based on Car2X technology, preferably according to the IEEE 802.11p standard, would likewise be conceivable. The evaluation and transmission of the data to other road users can also be carried out by a government agency or another central agency. In particular, informing a roadside assistance service via a central database of a roadside assistance service company can be advantageous. In this way, roadside assistance services are able to compare their jobs with the database and thereby use the exact position of the broken-down vehicle for their planning. Furthermore, it would be possible to automatically send a roadside assistance service to the broken-down vehicle. It is also possible, of course, to transmit the pieces of information to a receiving agency of an automobile association or a commercially managed facility.

In one embodiment, the collected data regarding the surroundings of the motor vehicle may be transmitted to a receiver upon detection of the trigger without being processed. An evaluation of this data, which can also include raw sensor data, can take place, for example, using computing capacities of the receiving agency or the receiving agencies. For example, the approach of cloud computing may be used so as to save computing capacity in the motor vehicle.

In one embodiment, the collected data regarding the surroundings of the motor vehicle may be at least partially evaluated upon detection of the trigger. Instead of raw data, specific pieces of information regarding the hazardous situation, for example, the type of broken-down vehicle, the number of involved persons, positions of hazardous objects and pieces of driving lane information, can then be transmitted.

This disclosure also relates to a computer program, comprising program code, to carry out a method when the program is executed on a microprocessor of a computer, and in particular on an electronic closed-loop and/or open-loop control unit of a motor vehicle.

A software solution in the form of an implementation on an existing closed-loop and/or open-loop control unit of a motor vehicle may be advantageous. Because it may already suffice to utilize an existing sensor system and further devices of the motor vehicle to carry out the method, this solution may be economically favorable, because only one program code has to be developed and executed on an appropriate device.

This disclosure also relates to a device for a motor vehicle for carrying out the method, comprising at least one surroundings monitoring sensor for identifying a trigger and for detecting a hazardous object, at least one means for determining a global motor vehicle position, a communication device for transmitting a detected hazardous situation to at least one receiver that is independent of the motor vehicle, and an electronic closed-loop and/or open-loop control unit, which is designed to evaluate data and/or to activate the communication device.

It is conceivable that the same surroundings monitoring sensor system is used for identifying the trigger and for detecting the hazardous object. As in the above embodiments regarding the method, however, it is also possible to use a wide range of different surroundings monitoring sensors. The surroundings monitoring sensor system can, of course, also be used to record road traffic-relevant data, such as the above-described pieces of traffic dynamics information and/or pieces of driving lane information and/or pieces of weather information.

Exemplary embodiments are described hereafter based on the drawings, from which further features will be apparent.

Figure 2:
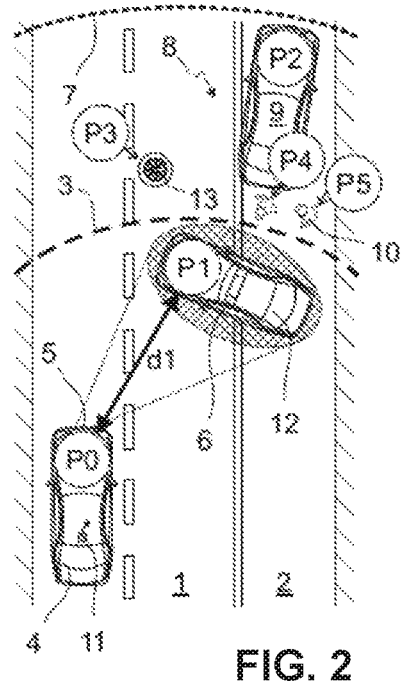
FIG. 2 illustrates a schematic representation of a further traffic situation including a trigger in a hazardous situation, according to some embodiments.
Figure 3:
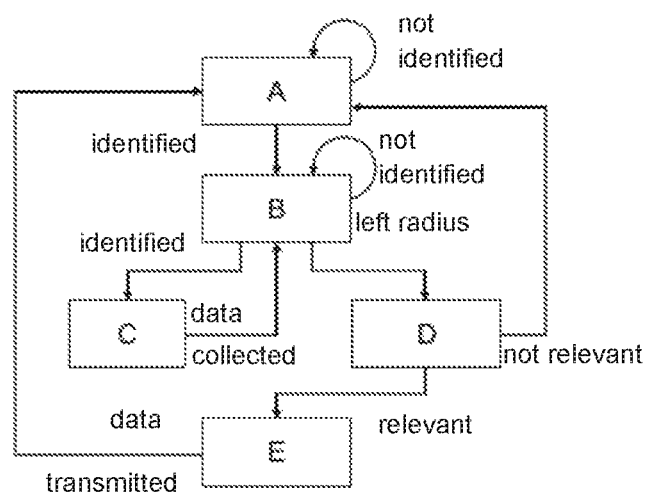
FIG. 3 illustrates an exemplary flow chart of a disclosed method, according to some embodiments.

In the drawings:

FIG. 1 shows a schematic representation of a traffic situation including a trigger and a subsequent hazardous situation, according to some embodiments;

FIG. 2 shows a schematic representation of a further traffic situation including a trigger in a hazardous situation, according to some embodiments; and FIG. 3 shows an exemplary flow chart of a method, according to some embodiments.

FIG. 1 shows an exemplary traffic situation on a two-lane road 1 including a breakdown lane 2. The visible surroundings 3 of a motor vehicle 4 are scanned for the presence of a trigger, such as a warning triangle 6, by way of an optical surroundings monitoring sensor 5 assigned to the motor vehicle 4. The motor vehicle 4 shown in FIG. 1 detects a warning triangle 6 in the breakdown lane 2. Subsequent to the detection of the warning triangle 6, the motor vehicle 4 collects data regarding the surroundings 3 of the motor vehicle 4 by way of at least one surroundings monitoring sensor 5 within a trigger-specific radius 7.

In one embodiment, the trigger-specific radius 7 can include a range between 1 m and 2000 m, preferably between 5 m and 1000 m, and most particularly preferably between 10 m and 500 m. A trigger-specific radius 7 for a warning triangle 6 can encompass a range of up to 1000 m, for example, because it is stipulated in Germany, for example, to position a warning triangle 6 on highways at a distance of at least 150 m to 400 m from a hazardous situation 8, and sufficiently far in front of a curve or a hilltop. An appropriately large trigger-specific radius 7 should be considered for monitoring the surroundings 3 upon detection of the warning triangle 6. If the computing capacity and flexibility of the sensor system of the motor vehicle 4 is sufficiently good, a larger trigger-specific radius 7 would also be conceivable. Of course, it would also be conceivable that a trigger, such as an emergency vehicle 12 or a reflective vest, is located directly at the hazardous situation 8. Accordingly, monitoring for hazardous objects, such as a broken-down vehicle 9, two persons 10, the emergency vehicle 12, and a wheel 13, for example, should also be started as close to the identified trigger as possible.

For the sake of clarity, the trigger-specific radius 7 shown in FIG. 1 is illustrated in an excessively shortened manner and should therefore be understood to be purely schematic. Subsequent to the detection of a hazardous situation 8, represented in the example by the broken-down vehicle 9 and the two persons 10, the motor vehicle 4 can transmit the collected data to independent receivers (not shown) via a communication device 11.

The collected data can be pieces of position information regarding the warning triangle 6, the broken-down vehicle 9 and the persons 10, for example. It is furthermore possible to transmit the nature of the respective hazardous objects, namely the broken-down vehicle 9, the two persons 10, and the like. Other pieces of information can also be transmitted, of course.

FIG. 2 shows a further exemplary traffic situation. The trigger in this situation is a visual special-purpose signal of an emergency vehicle 12, wherein the emergency vehicle 12 is also to be classified as a hazardous object. In addition to the broken-down vehicle 9 and the two persons 10, debris present in the right driving lane, such as the wheel 13, can also be identified as a hazardous object.

It may also be provided that the trigger at the same time is a hazardous object, the broken-down vehicle 9, the two persons 10, the emergency vehicle 12, or the wheel 13.

The global positions P1, P2, P3, P4, P5 in which the identified hazardous objects, the broken-down vehicle 9, the two persons 10, the emergency vehicle 12, and the wheel 13, are located is a piece of relevant information. Initially, the global position P0 of the identifying motor vehicle 4, which is frequently known due to the use of GPS, may be used as a basis for determining the global positions P1, P2, P3, P4, P5. Instead of GPS, any arbitrary global navigation satellite system (GNSS) can be used, of course. By merging this starting position P0 with distance data dl of at least one distance sensor (not shown) assigned to the motor vehicle 4 with respect to a relative distance between the hazardous objects, the broken-down vehicle 9, the two persons 10, the emergency vehicle 12, and the wheel 13, and the motor vehicle 4, it is possible to determine the individual global positions P1, P2, P3, P4, P5 of the identified hazardous objects, the broken-down vehicle 9, the two persons 10, the emergency vehicle 12, and the wheel 13. In the example in FIG. 2, the global position P1, for example in the form of geographic coordinates, of the emergency vehicle 12 is determined based on the relative distance dl between the emergency vehicle 12 and the motor vehicle 4 and the global position P0, for example in the form of geographic coordinates, of the motor vehicle 4.

In particular, a distance sensor or another device of an existing adaptive cruise control system of the motor vehicle 4 can be used, which determines the relative distance dl between the identifying motor vehicle 4 and the identified emergency vehicle 12.

These pieces of information can subsequently be transmitted to a database of a roadside assistance service, a TMC center, a government agency, or other road users.

FIG. 3 shows an exemplary flow chart. The sequence could be carried out, for example, in the form of a computer program using program code means on a microprocessor of a computer, and in particular on an electronic closed-loop and/or open-loop control unit of the motor vehicle 4.

In a basic state A, the visible surroundings 3 of the motor vehicle 4 are scanned by way of at least one surroundings monitoring sensor 5 at regular intervals for the presence of a trigger, such as the warning triangle 6. This is repeated until a trigger has been identified.

Upon detection of a trigger, a switch into a data recoding state B is made. In principle, data regarding the surroundings 3 of the motor vehicle 4 is collected in this state. For example, road traffic-relevant data, such as pieces of driving lane information, pieces of weather information or pieces of traffic dynamics information, can be compiled in this way. At the same time, at least one surroundings monitoring sensor 5 of the motor vehicle 4 searches for one or more hazardous objects, such as the broken-down vehicle 9, the two persons 10, the emergency vehicle 12, and the wheel 13. This is repeated until a hazardous object has been identified.

If such a hazardous object is identified, a switch into a state for recording object-specific data C is made. After the object-specific data has been recorded, a switch occurs back into the data recording state B.

The data recording state B is maintained as long as the motor vehicle 4 is located in a trigger-specific radius 7. The motor vehicle 4 having left the radius may be determined by a driven distance proceeding from the trigger (for example, the warning triangle 6) in the driving direction or in the direction of the course of the road, or a predefined time period.

After the trigger-specific radius 7 is left, a switch into an evaluation state D may occur. If it is identified in this state that the identified situation is not relevant to a hazardous situation 8 for road traffic, for example, because a "forgotten" warning triangle 6 was identified, it is possible to switch back into the basic state A, without carrying out any further action.

Otherwise, a switch into the communication state E can be made upon detection of a relevant hazardous situation 8. At this point, the ascertained data regarding the hazardous situation 8 is transmitted. This may be raw sensor data, preliminarily evaluated data, or fully evaluated data regarding the hazardous situation 8. After the data has been transmitted to a location that is independent of the motor vehicle 4, a switch back into the basic state A may take place.

It should be mentioned that an evaluation of data according to the evaluation state D is not absolutely necessary. The evaluation state D may also be skipped, wherein a direct switch from the data recording state B into the communication state E may occur. For example, raw sensor data can be transmitted to an external computing center, wherein the external computing center evaluates the raw data and, where necessary, informs a further facility, for example a TMC center, about an identified hazardous situation 8.

Of course, any arbitrary other flow chart that can be used to carry out the disclosed method is also conceivable.

The invention claimed is:

1. A method for detecting a hazardous situation in road traffic, the method comprising:
   receiving a list of one or more predetermined triggers;
   scanning, by at least one surroundings monitor sensor, surroundings of a motor vehicle;
   detecting, by the at least one surroundings monitor sensor, a trigger based on the list, wherein the trigger matches at least one of the one or more predetermined triggers;
   searching, by the at least one surroundings monitor sensor, in response to the detecting the trigger, for at least one hazardous object that is different from the trigger within a trigger-specific radius around the trigger;
   locating, by the at least one surroundings monitor sensor, the at least one hazardous object;
   collecting, by the at least one surroundings monitoring sensor, upon the locating the at least one hazardous object, object-specific data regarding the at least one hazardous object; and transmitting, by a communication device communicatively coupled to the at least one surroundings monitoring sensor, pieces of information based on the object-specific data to at least one receiver that is independent of the motor vehicle.

2. The method of claim 1, wherein the object-specific data of the at least one hazardous object comprise position information, classification information, geometry information, color information, texture information, or dynamics information about the at least one hazardous object.

3. The method of claim 2, wherein the position information is determined from a global motor vehicle position or from data of at least one distance sensor with respect to a relative distance between the at least one hazardous object and the motor vehicle.

4. The method of claim 1, wherein the trigger comprises a warning triangle, a reflective vest, or a visual special-purpose signal of an emergency vehicle.

5. The method of claim 1, wherein the at least one hazardous object comprises a broken-down vehicle, an emergency vehicle, a person, or debris.

6. The method of claim 1, wherein the at least one surroundings monitoring sensor comprises a camera system, a night vision system, or at least one device of an adaptive cruise control system.

7. The method of claim 1, wherein the transmitting, by the communication device, of the pieces of information based on the object-specific data regarding the surroundings of the motor vehicle, is to a Traffic Message Channel (TMC) center, a database of a roadside assistance service, a government agency, or other road users.

8. A system, comprising:
a memory; and
at least one processor coupled to the memory, wherein the at least one processor is configured to:
receive a list of one or more predetermined triggers;
scan surroundings of a motor vehicle;
detect a trigger based on the list, wherein the trigger matches at least one of the one or more predetermined triggers;
search, in response to detection of the trigger, for at least one hazardous object that is different from the trigger within a trigger-specific radius around the trigger;
locate the at least one hazardous object;
collect, upon the locating the at least one hazardous object, object-specific data regarding the at least one hazardous object; and
transmit pieces of information based on the object-specific data to at least one receiver that is independent of the motor vehicle.

9. The system of claim 8, wherein the object-specific data of the located at least one hazardous object comprise position information, classification information, geometry information, color information, texture information, or dynamics information about the at least one hazardous object.

10. The system of claim 9, wherein the position information is determined from a global motor vehicle position or from data of at least one distance sensor with respect to a relative distance between the at least one hazardous object and the motor vehicle.

11. The system of claim 8, wherein the trigger comprises a warning triangle, a reflective vest, or a visual special-purpose signal of an emergency vehicle.

12. The system of claim 8, wherein the at least one hazardous object comprises a broken-down vehicle, an emergency vehicle, a person, or debris.

13. The system of claim 8, wherein the at least one processor is communicatively coupled to and processes data from a camera system, a night vision system, or at least one device of an adaptive cruise control system to scan the surroundings of the motor vehicle and to detect the trigger.

14. A tangible computer-readable device having instructions stored thereon that, when executed by a computing device, cause the computing device to perform operations comprising:
receiving a list of one or more predetermined triggers;
scanning surroundings of a motor vehicle;
detecting a trigger based on the list, wherein the trigger matches at least one of the one or more predetermined triggers;
searching, in response to the detecting the trigger, for at least one hazardous object that is different from the trigger within a trigger-specific radius around the trigger;
locating the at least one hazardous object;
collecting, upon the locating the at least one hazardous object, object-specific data regarding the at least one hazardous object; and
transmitting pieces of information based on the object-specific data to at least one receiver that is independent of the motor vehicle.

15. The computer-readable device of claim 14, wherein the object-specific data of the at least one hazardous object comprise position information, classification information, geometry information, color information, texture information, or dynamics information about the at least one hazardous object.

16. The computer-readable device of claim 15, wherein the position information is determined from a global motor vehicle position or from data of at least one distance sensor with respect to a relative distance between the at least one hazardous object and the motor vehicle.

17. The computer-readable device of claim 14, wherein the trigger comprises a warning triangle, a reflective vest, or a visual special-purpose signal of an emergency vehicle.

18. The computer-readable device of claim 14, wherein the at least one hazardous object comprises a broken-down vehicle, an emergency vehicle, a person, or debris.

19. The computer-readable device of claim 14, wherein the computing device is communicatively coupled to a camera system, a night vision system, or at least one device of an adaptive cruise control system for the scanning of the surroundings of the motor vehicle and the detecting of the trigger.

20. The computer-readable device of claim 14, wherein the computing device comprises an electronic closed-loop or open-loop control unit of the motor vehicle.

21. The method of claim 1, wherein the trigger indicates a presence of the at least one hazardous object.

* * * * *